E. A. RUMELY.
TRACTOR.
APPLICATION FILED APR. 11, 1912.
1,055,085.
Patented Mar. 4, 1913.
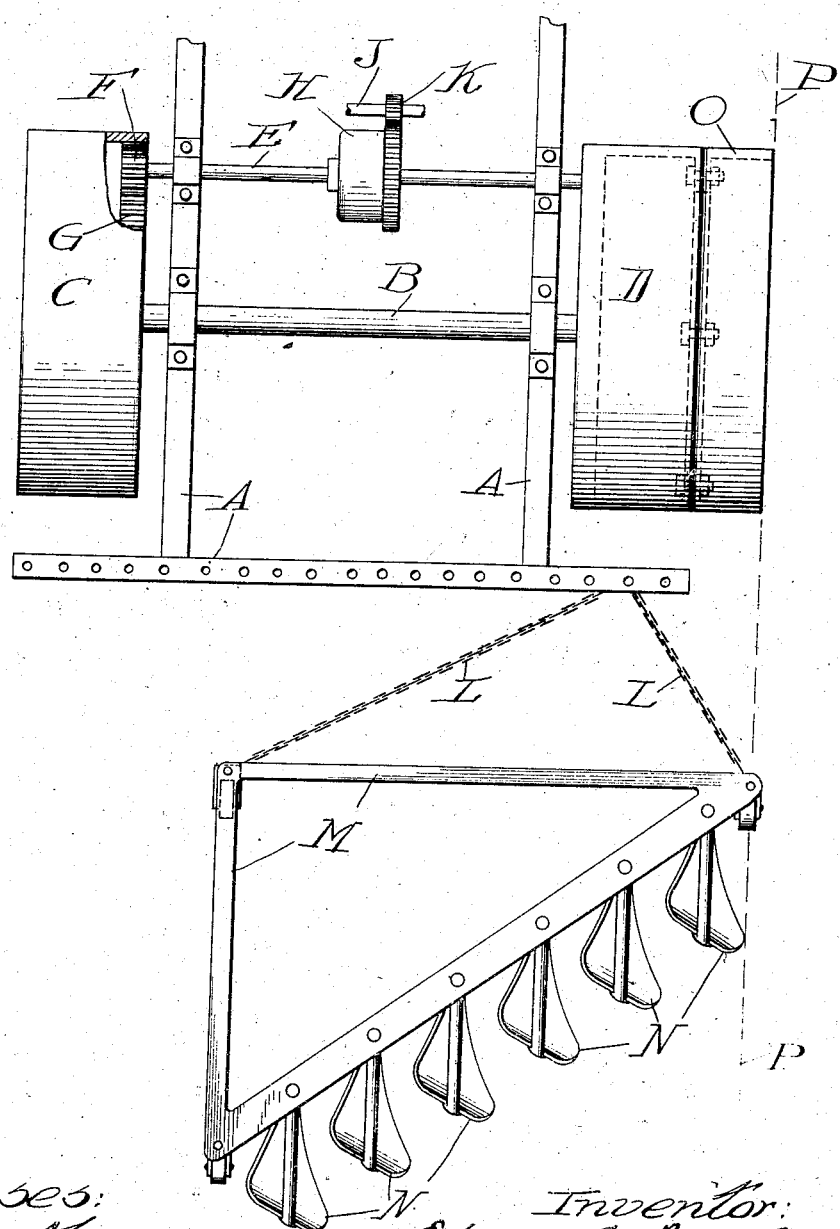

UNITED STATES PATENT OFFICE.

EDWARD A. RUMELY, OF LAPORTE, INDIANA, ASSIGNOR TO M. RUMELY COMPANY, OF LAPORTE, INDIANA, A CORPORATION OF INDIANA.

TRACTOR.

1,055,085.  Specification of Letters Patent.  Patented Mar. 4, 1913.

Application filed April 11, 1912. Serial No. 690,164.

*To all whom it may concern:*

Be it known that I, EDWARD ALOYSIUS RUMELY, a citizen of the United States, residing at Laporte, in the county of Laporte and State of Indiana, have invented a certain new and useful Improvement in Tractors, of which the following is a specification.

My invention relates to means for equalizing the slippage of the drive wheels of a tractor particularly in cases where for some reason the load is to be drawn by a tractor under circumstances which make it necessary to throw an excess of that load on one wheel.

My invention is illustrated in the accompanying drawing which presents a fragmentary view in a more or less diagrammatic way of the rear end of a tractor with a gang of plows attached thereto.

A A are portions of the tractor frame, B the drive shaft, C one wheel and D the other or, in this case, the furrow wheel. These wheels are driven in the usual manner as, for example, by a short shaft E, pinion F and internal gear G. The shaft emerges, of course, from a casing H in which are the differential gears driven from the jack-shaft J by means of the pinion K. To the rear frame piece is attached by means of the chains L the frame M on which are arranged the plows N N. These, of course, are arranged along a line at a sharp inclination to the line of forward motion of the tractor and gang plows. This is only one example of many where the load is arranged so that it is thrown more on one wheel than on another and in all such cases the slippage on that wheel is excessive. The usual inequalities between the slippage due to the varying load of the two driving wheels can be taken care of by the differential but in a case like that illustrated other means must be provided. Either wheel, as the case may be, can have its slippage increased or diminished to effect the accommodation. In this case I show the lateral extension O on the wheel D which gives it a wider face or ground contacting surface.

P P indicates the line of the furrow previously cut. The plows, of course, are shown diagrammatically.

It will be understood, of course, that the drawing is to be taken as in a sense diagrammatic and that the parts can be very differently constructed, proportioned and arranged and some be removed and others be substituted for them without departing from the spirit of my invention.

I shall explain the use and operation of my invention by describing its application to a tractor intended to draw a gang of plows. Such tractors commonly have two front and two rear wheels the latter traction wheels. The plows are arranged, of course, on a line sharply inclined to the line of forward movement, and the traction wheel next to the furrow must, of course, be in front of the first plow in the gang. This obviously throws a greater burden on the wheel at the furrow side causing a tendency to slip. In practice this is counteracted by setting the forward wheels at an angle.

I propose now to supplement the effect of the differential between the two traction wheels, which is sufficient to take care of the inequality in the slip of the two wheels for ordinary purposes, by means associated with the furrow side wheel to increase its grip on the ground or diminish its tendency to slip. In the form in which I have shown my invention as applied this wheel is intended to have a broader face to bear upon the ground. The same effect, of course, could be obtained in various other ways. The essential point is to equalize the slippage between the wheels by either increasing the slippage of one or diminishing the slippage of the other. In the case illustrated the slippage of the furrow side wheel is diminished because it is provided with a more extended face to bear upon the soil.

I claim:

1. In a tractor having a pair of drive wheels the combination of a differential between said wheels with separate means for equalizing their slip.

2. In a tractor having a pair of drive wheels the combination of a differential between said wheels with separate means for diminishing the slip of one of them.

3. In a tractor having a pair of drive wheels the combination of a differential between said wheels with separate means associated with one wheel for equalizing their slip.

4. In a tractor having a pair of drive wheels the combination of a differential between said wheels with separate means associated with one wheel for diminishing the slip of one of them.

5. In a tractor having a pair of drive wheels the combination of a differential between said wheels with means attached to one of said wheels to diminish its tendency to slip.

6. In a tractor having a pair of drive wheels the combination of a differential between said wheels with means laterally projecting from one of said wheels to diminish its tendency to slip.

7. In a tractor having a pair of drive wheels the combination of a differential interposed between them and a lateral extension on one of said wheels to give it a wider face than the other.

Signed at Laporte, Indiana.

EDWARD A. RUMELY.

Witnesses:
JOHN A. SECER,
FRANCIS W. PARKER, Jr.

Copies of this patent may be obtained for five cents each, by addressing the "Commissioner of Patents, Washington, D. C."